United States Patent Office 3,279,490
Patented Oct. 18, 1966

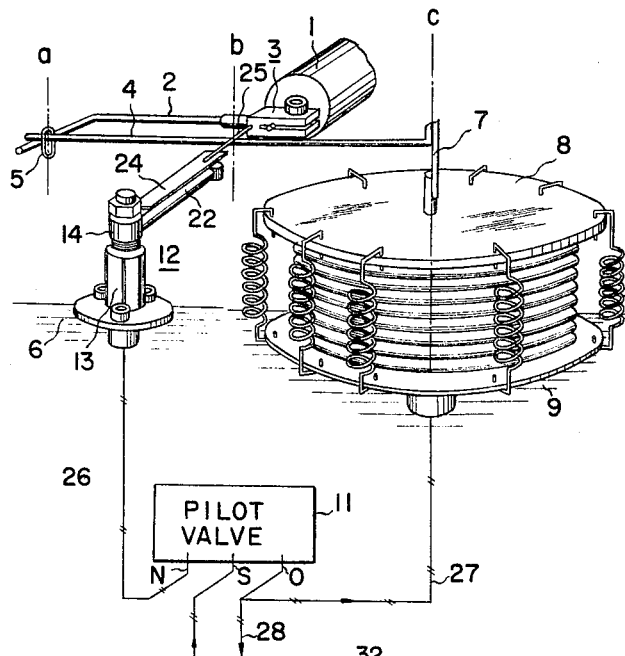
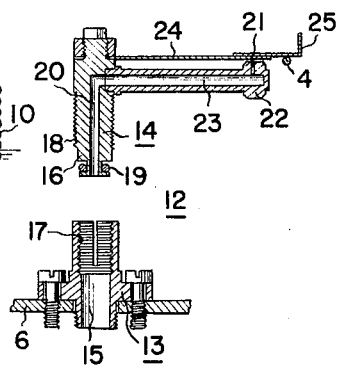
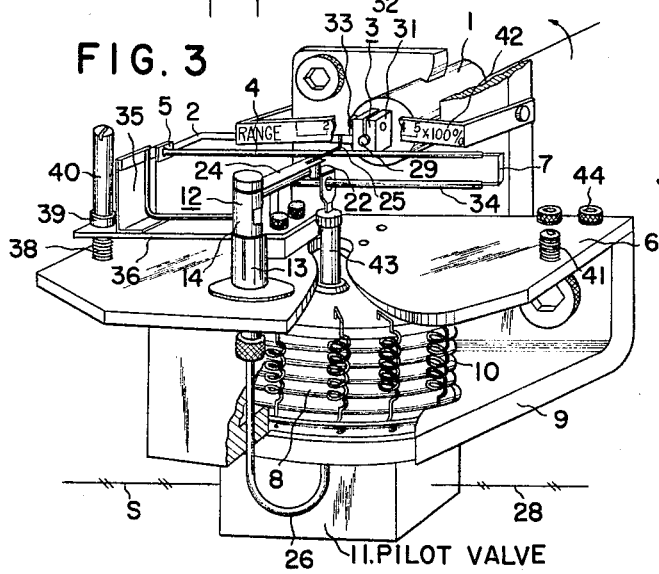
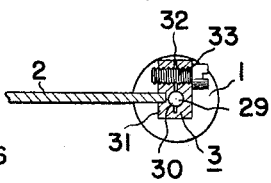

3,279,490
APPARATUS FOR CONVERTING DISPLACE-
MENT INTO AIR PRESSURE
Motohisa Nishihara, Hikaru Hasegawa, Koichi Nakahara, and Shigeyuki Kobori, all of Hitachi-shi, Japan, assignors to Kabushiki Kaisha Hitachi Seisakusho, Chiyoda-ku, Tokyo-to, Japan, a joint-stock company of Japan
Filed Mar. 31, 1964, Ser. No. 356,317
Claims priority, application Japan, Sept. 6, 1963, 38/65,795, 38/65,796; Sept. 23, 1963, 38/70,325
5 Claims. (Cl. 137—85)

This invention relates to apparatuses which measure variables as positional displacements and convert these displacements into air pressures. More specifically, the invention relates to improvements in such apparatuses.

Although a great variety of displacement to air pressure conversion apparatuses dependent on the displacement balancing method are known in the prior art, those so adapted as to be capable of changing their gain (output to input ratio) have been few in number. Of these displacement to air pressure conversion apparatuses of the variable gain type, there have been the following principal systems as identified by constructional arrangement owing to principle.

(1) The system wherein, between a nozzle flapper assembly and a feedback bellows device, there are provided two levers, between which there is provided a pivot to transmit displacements of the feedback bellows from one of the levers to the other, and the position of this pivot is shifted to vary the feedback displacement quantity, and thereby to vary the gain.

(2) The system wherein, between a nozzle flapper and a feedback bellows device, there is provided one lever which constitutes a balance beam provided at an intermediate point thereof with a pivot which is shiftable in the longitudinal direction of the beam, and, by shifting this pivot, the lever arm ratio is varied to increase or decrease the feedback displacement, and thereby to vary the gain.

(3) The system wherein, by varying the spring constant of a spring means in a feedback mechanism, the feedback displacement quantity is increased or decreased to vary the gain.

These systems, however, have the following drawbacks. The above system (1) requires a shiftable pivot, and the errors arising in the fabrication and assembly of this shiftable pivot tend to disturb the stability of the apparatus. Moreover, since this shiftable pivot is interposed between two levers, the friction at this part increases, thereby producing hysteresis, whereby the accuracy of the apparatus drops. In the case also of the above system (2), the hysteresis is increased greatly by the friction in the pivot part, whereby high accuracy cannot be expected. In the case of the above system (3), it is not possible to accomplish highly accurate gain variation because of the difficulty of changing the spring constant of the feedback mechanism in a continuous manner.

The present invention, in its broader aspects, contemplates improving displacement to air pressure converting apparatuses based on the above mentioned conventional systems, which apparatuses measure pressures, flowrates, liquid levels, temperatures, and other variables, extract the measured values as displacements, and convert these displacements into air pressure.

More specifically, it is the first object of the present invention to provide an apparatus of the instant type in which a nozzle flapper assembly is constructed as a single unit and adapted to be freely rotatable relative to a base, and, by changing the contact point between a sliding pin attached to one part of the nozzle flapper section and an actuating lever, it is possible to vary the gain without lowering the accuracy.

It is the second object of the invention to provide an arrangement, in an apparatus of the instant type, whereby, by positioning the actuating lever horizontally, fluctuations of the zero point at the time of gain variation are eliminated, and, at the same time, the horizontal position of the actuating lever can be adjusted.

It is the third object to provide an apparatus of the instant type wherein, in order to prevent variation in the operation of the apparatus due to the effect of vibrations originating from the outside, the nozzle flapper assembly is constructed as a single unit and fixed to a base, and, by causing a sliding pin provided at one part of the nozzle flapper to contact an actuating lever, feedback is applied to the nazzle flapper to reduce the weight of the actuating lever and reduce to an extremely small degree any unstable motion of the actuating lever due to external vibrations.

It is the fourth object to provide an apparatus of the instant type with a construction wherein the input shaft center, the feedback bellows center, and the center of rotation of the nozzle flapper assembly are all disposed in the same plane, thereby to make possible simple changing between regular operation and inverse operation. By this construction, it is possible, in cases such as liquid level control where it is necessary to obtain a large output when the input is small (inverse operation), to change in a simple manner a device producing an output proportional to the input (regular operation).

It is the fifth object to provide, in an apparatus of the instant type, an auxiliary actuating lever to magnify the movements of the feedback bellows and to transmit the magnifield movements to the actuating lever and, by reducing the displacement quantity of the feedback bellows, reduce the effect of the bellows characteristics on the linear error.

It is a further object to miniaturize the entire apparatus.

With the foregoing and other objects in view, the invention resides in the novel arrangement and combination of parts and in the details of construction hereinafter more particularly described with respect to preferred embodiments of the invention, reference being had to the accompanying drawings in which like parts are designated by like reference characters, and in which:

FIGURE 1 is a perspective view, partly in schematic form, showing a preferred embodiment of the apparatus according to the invention;

FIGURE 2 is an exploded elevational view in vertical section showing, in partially disassembled state, the nozzle flapper assembly of the apparatus shown in FIGURE 1;

FIGURE 3 is a perspective view, with parts cut away, showing another preferred embodiment of the invention;

FIGURE 4 is an elevational view, in vertical section, showing the device for mounting the input transmitting arm used in the apparatus shown in FIGURE 3;

Figure 5A:
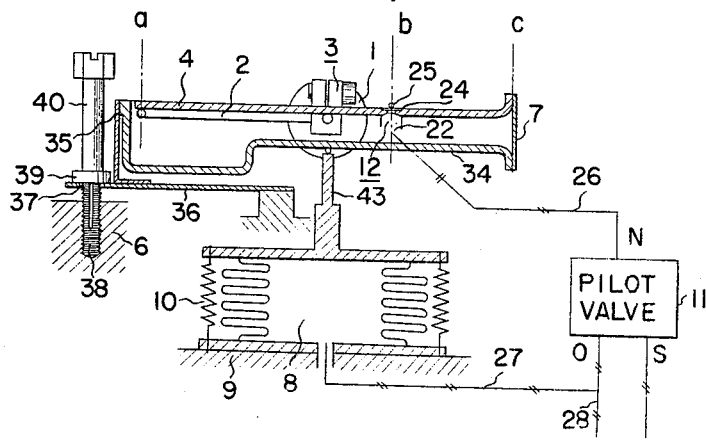
Figure 5B:
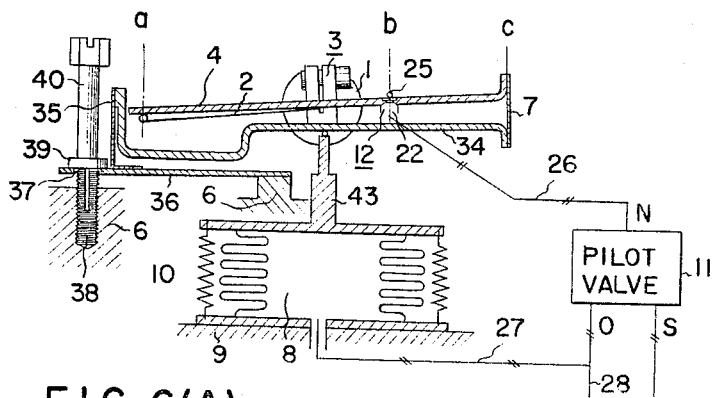
Figures 6A, 6B:
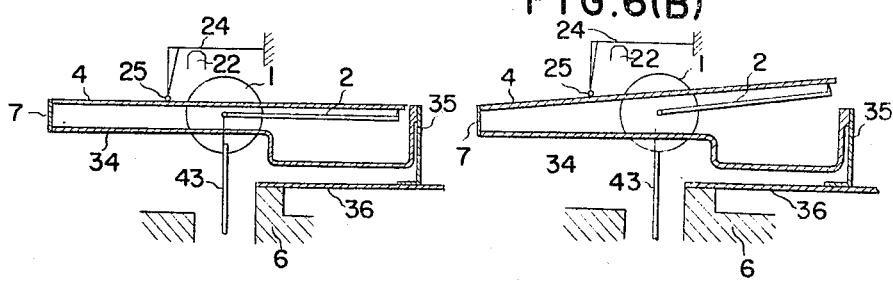

FIGURES 5(A) and 5(B) are elevational views, partly in vertical section and partly in schematic form, indicating the operation of the apparatus shown in FIGURE 3, FIGURE 5(A) indicating the state when the input displacement is zero, and FIGURE 5(B) indicating the state when an input displacement is applied; and FIGURES 6(A) and 6(B) are simplified elevational views, in vertical section, indicating the inverse operation of the apparatus shown in FIGURE 3, FIGURE 6(A) indicating the state when the input displacement is zero, and FIGURE 6(B) indicating the state when an input displacement is applied.

Referring first to FIGURES 1 and 2 showing a preferred embodiment of the invention, reference character 1 designates an input shaft through which a measured displacement is transmitted. An input transmitting arm 2 is secured at its one end by means of an input transmitting arm mounting device 3 to the end of the input shaft 1. The input transmitting arm 2 is bent at its other end so that the entire arm has the form of the letter L which, in normal assembled state, lies in a horizontal plane. One end of an actuating lever 4 is resting on the bent end of the input transmitting arm 2, the part of the actuating lever 4 in contact with the input transmitting arm 2 being passed through a guide device 5 provided on the input transmitting arm 2 to prevent horizontal shifting of the actuating lever 4.

This actuating lever 4, which is horizontally supported, is coupled at its other end, through a leaf spring 7, to the center of a feedback bellows device 8. The leaf spring 7 is so adapted that it also imparts to the actuating lever 4 a torque such that the actuating lever 4 is caused to follow up movements of the input transmitting arm 2.

The feedback bellows device 8 is fixed at its lower surface to a base 9, and counter-springs 10 are stretched between the upper and lower plates of the bellows device 8. The interior of the feedback bellows 8 is communicatively connected through a pipe 27 to an output take-out port O of a pilot valve 11.

On one hand, there is provided a nozzle flapper assembly 12 consisting of a stationary part 13 fixed to a base 6 and a movable part 14 mounted on the stationary part 13 in a freely rotatable yet gas-tight manner, as shown in detail in FIGURE 2. In assembled state, a cylindrical part 16 of the movable part 14 is inserted within a hollow cylindrical part 15 of the stationary part 13, female threads 17 of the stationary part 13 being in engagement with male threads 18 of the movable part 14. An O ring 19 for preventing air leakage is interposed between the hollow cylindrical part 15 of the stationary part 13 and the cylindrical part 16 of the movable part 14.

In the interior of the movable part 14, there is formed an axial air passage 20, which communicates at its upper end with an axial air passage 23 in a nozzle 22 fixed at its one end to the side of the movable part 14 and provided at its other, outer end with an upwardly directed jet orifice 21 communicating at its lower end to the outer end of air passage 23.

A flapper 24 consisting of a leaf spring is fixed at its one end to the upper part of the movable part 14 and is disposed horizontally to face the jet orifice 21 of the nozzle 22 so that a part of the flapper 24 near its outer end can function as a valve with respect to the jet orifice 21. On the outer end of the flapper 24, there is attached a sliding pin 25 which is positioned to rest on the aforementioned actuating lever 4. Accordingly, when the actuating lever 4 displaces the flapper 24 downwardly, the flapper 24 tends to close the jet orifice 21 of the nozzle 22, and when the actuating lever 4 displaces the flapper 24 upwardly, the jet orifice 21 is opened. Furthermore, the mechanism is so arranged that even when the movable part 14 of the nozzle flapper assembly 12 is revolved, that is, about a vertical axis, the sliding pin 25 is always resting on the actuating lever 4.

The hollow interior 15 of the stationary part 13 of the nozzle flapper assembly 12 is communicatively connected by way of a nozzle back pressure pipe 26 to a nozzle back pressure chamber of the pilot valve 11 through a back pressure connection N. This nozzle back pressure chamber communicates through a throttling device with an air pressure supply S. The pilot valve 11 is so constructed that when the nozzle back pressure varies, an air pressure proportional to the back pressure is transmitted from the air pressure supply S to the aforementioned output take-out port O of the pilot valve 11. This output take-out port O is communicatively connected by the pipe 27 to the interior of the feedback bellows 8 as described hereinbefore and, moreover, is connected to an output air pressure lead-out pipe 28.

In the arrangement of the embodiment of the invention shown in FIGURE 1, the guide device 5 and the leaf spring 7 of the input transmitting arm 2 and the coupling part of the feedback bellows 8 may be mutually exchanged as one modified arrangement.

The apparatus of the above described construction and arrangement embodying the invention operates in the following manner. When the input shaft 1 is caused by a measured value to rotate in the counter-clockwise direction as viewed in FIGURE 1, the input transmitting arm 2 rotates about the axis of the input shaft 1 in the counter-clockwise direction. Following up the counter-clockwise rotation of the input transmitting arm 2, the actuating lever 4 moves with the leaf spring 7 as a pivot and causes the sliding pin 25 on the actuating lever 4 to move downwardly, thereby causing the flapper 24 of the nozzle flapper assembly 12 to approach the jet orifice 21 of the nozzle 22.

Since the flowrate of the air supplied through the pilot valve 11 and being ejected from the jet orifice 21 of the nozzle flapper assembly 12 is thereby restricted, the pressure in the nozzle back pressure chamber of the pilot valve 11 increases, and this pressure variation is magnified and is taken out at the output take-out port O of the pilot valve 11. Consequently, the air pressure within the feedback bellows 8 and the output air lead-out pipe 28 increases, and the feedback bellows 8 expands upwardly against the force of the counter-springs 10. This upward movement of the upper part of the feedback bellows 8 is transmitted through the leaf spring 7 to the actuating lever 4, which is thereby caused to move with the point of contact between the actuating lever 4 and the input transmitting arm 2 as a pivot, and this movement of the actuating lever 4 is transmitted through the sliding pin 25 to return the flapper 24 of the nozzle flapper assembly 12 to its original position.

Thus, the position of the flapper 24 of the nozzle flapper assembly 12 is determined; the pressure of the air flowing through the output air lead-out pipe 28 connected to the pilot valve 11 is determined; and this air pressure is extracted as the desired output.

In the apparatus according to the present invention operating in the above described manner, the ratio of the pressure $P_o$ (output) of the air flowing through the output air lead-out pipe 28 to the displacement X (input) applied from the input shaft 1 by means of the input transmitting arm 2 to the actuating lever 4, that is, the ratio $P_o/X$ (called the gain), can be changed in a simple manner without lowering accuracy, as will be more specifically described hereinbelow.

Referring to FIGURE 1, the point of contact between the input transmitting arm 2 and the actuating lever 4 will be designated by the reference character $a$, that between the actuating lever 4 and the sliding pin 25 of the nozzle flapper assembly 12 by $b$, and that between the actuating lever 4 and the leaf spring 7 by $c$. Then, by using pairs of these reference characters to denote respective distances between these points of contact, the gain G according to the above described operation may be expressed by the following equation.

$$G = \frac{P_o}{X} = \frac{bc}{ac} \cdot \frac{1}{\dfrac{1}{G_{NF} \cdot G_P} + \dfrac{ab}{ac} \dfrac{S_{FB}}{K_{FB}}}$$

where: $S_{FB}$ is the effective area of the feedback bellows 8; $K_{FB}$ is the spring constant of the feedback bellows device 8; $G_{NF}$ is the gain of the nozzle flapper assembly 12, and $G_P$ is the gain of the pilot valve 11.

Since $$\frac{ab}{ac} \cdot \frac{S_{FB}}{K_{FB}} \gg \frac{1}{G_{NF} \cdot G_P}$$

the following relationship is obtained.

$$G = \frac{bc}{ac} \cdot \frac{1}{\dfrac{ab}{ac} \dfrac{S_{FB}}{K_{BF}}} = \frac{bc}{ab} \cdot \frac{K_{FB}}{S_{FB}}$$

Then, since the effective area $S_{FB}$ of the bellows 8 and the spring constant $K_{FB}$ of the bellows device 8 are constant, the gain G varies in proportion to the actuating lever ratio $bc/ab$.

Accordingly, by turning the movable part 14 of the nozzle flapper assembly 12 about the stationary part 13 as the center of rotation, thereby varying the position of contact of the sliding pin 25 with respect to the actuating lever 4, and thereby varying the actuating lever ratio $bc/ab$, it is possible to change the gain in a simple manner.

It is to be observed that, according to this invention, since an additional moving pivot for changing the actuating lever ratio is not used, the possibility of error thereby entering the operation at the time of gain changing is low, and accuracy is thereby maintained. Furthermore, since the nozzle flapper assembly 12 is not fixed directly to the actuating lever 4, the actuating lever 4 is not required to possess mechanical strength for such direct fixing. For this reason, the weight (mass) of the actuating lever 4 can be substantially reduced, and unstable operation of the actuating lever 4 due to external vibrations can be greatly reduced. Moreover, since the actuating lever 4 is maintained in a substantially horizontal orientation, shifting of the zero point at the time of gain changing is prevented.

In another embodiment of the invention as illustrated in FIGURES 3 through 6, the displacement input is introduced by an input shaft 1 to an input transmitting arm 2 mounted at its one end on this input shaft 1 by means of an input transmitting arm mounting device 3. As shown in detail in FIGURE 4, this input transmitting arm mounting device 3 has an arm holding member 31 having a through hole 30 in which there is inserted a small-diameter shaft 29 provided coaxially on the input shaft 1, and one end of the input transmitting arm 2 is fixed to this arm holding member 31. This arm holding member 31 is constructed to clamp onto the shaft 29, being provided from its outside to the through hole 30 with a slit 32 and a clamp screw 33 for adjusting the gap distance of the slit 32 and tightening the through hole walls about the small-diameter shaft 29.

The other end of the input transmitting arm 2 is bent in the horizontal plane in the form of the letter L, and one end of an actuating lever 4 is resting on one part of the said end so bent. The said end of the actuating lever 4 is inserted through a guide device 5 provided on the input transmitting arm 2 at its part in contact with the actuating lever 4 so as to prevent horizontal shifting of the actuating lever 4.

This actuating lever 4, which is horizontally supported, is coupled at its other end, through a leaf spring 7 to one end of an auxiliary actuating lever 34. The leaf spring 7 is so adapted that it also imparts to the actuating lever 4 a torque such that the actuating lever 4 is caused to follow up movements of the input transmitting arm 2. The auxiliary actuating lever 34 is disposed at a level below that of the actuating lever 4 and is fixed at its other end, that is, its end opposite to that coupled to the leaf spring 7, through a mounting plate spring 35 to an intermediate part of a plate spring 36 fixed at one end thereof to a base 6. At the free end of the plate spring 36, there is passed a stud bolt 38 provided with a through slot 37 and fixed to the base 6. An adjusting nut 40 of tubular cap form having a large diameter flange 39 at its lower end is screwed onto the stud bolt 38.

A feedback bellows device 8 is mounted below the base 6 in a position such that its centerline lies in the vertical plane passing through the centerline of the input shaft 1 and is provided at its upper center part with an upwardly extending pin 43 which is in contact, in the said vertical plane, with an intermediate part of the auxiliary actuating lever 34. The feedback bellows device is fixed at its lower part to a base 9 and is provided with counter-springs 10 stretched between its upper and lower parts. The base 6 and the base 9 are fastened together as a single structure by bolts 44. The interior of the feedback bellows 8 is communicated with the output takeout port O of a pilot valve 11, which in FIGURE 3 is shown to be fixed directly to the bottom surface of the base 9.

On the upper surface of the base 6, there is provided a nozzle flapper assembly 12, as shown in detail in FIGURE 2, consisting of a stationary part 13 fixed to the base 6 and a movable part 14 mounted on the stationary part 13 in a freely rotatable yet air-tight manner, the lower portion of the movable part 14 being screwed into the threaded bore of the fixed part 13. As described hereinbefore, an O ring 19 for preventing air leakage is interposed between the hollow circular part 15 of the stationary part 13 and the cylindrical part 16 of the movable part 14. The center of rotation of the movable part 14, similarly as in the case of the feedback bellows 8, is positioned to lie in the vertical plane passing through the centerline of the input shaft 1.

In the interior of the movable part 14, there is formed an air passage 20, which communicates at its upper end to the inner end of an air passage 23 formed in a nozzle 22 fixed at its inner end to the movable part 14 and having at its outer end an upwardly opened and directed jet orifice 21, which is communicated at its lower end to the outer end of the air passage 23. A flapper 24 consisting of a leaf spring and fixed at its one end to the movable part 14 is disposed so that its outer end portion faces the jet orifice 21 of the nozzle 22 and, moveover, is provided with a sliding pin 25 secured to its extreme end.

The sliding pin 25 rests on the actuating lever 4 and is so adapted that it always rests on the lever 4, even when the movable part 14 of the nozzle flapper 12 is rotated.

As shown in FIGURE 5, the hollow interior 15 of the stationary part 13 of the nozzle flapper 12 is communicatively connected by a nozzle back pressure pipe 26 to a nozzle back pressure chamber of the pilot valve 11 by way of a back pressure connection N. This nozzle back pressure chamber is communicated through a throttle to an air pressure supply S. At the same time, when the back pressure of this nozzle back pressure chamber varies, an air pressure proportional to the back pressure variation is transmitted from the air pressure supply S to the output takeout part O of the pivot valve 11. This output take-out port O is communicatively connected by a pipe 27 to the interior of the feedback bellows 8 as described hereinbefore and, moreover, is connected to an output air pressure leadout pipe 28.

A stud bolt 41 is provided on the base 6 in a position symmetrically opposite the aforementioned stud bolt 38 with respect to the vertical plane passing through the axis of the feedback bellows 8 and the centerline of the input shaft 1. A calibrated scale 42 is provided to indicate the rotational position of the movable part 14 of the nozzle flapper assembly 12.

The apparatus of the above described construction and arrangement embodying the invention operates in the manner described below, with reference made principally to FIGURE 5. When the input shaft 1 is caused by a measured value to rotate in the counter-clockwise direction as viewed in FIGURES 3 and 5, the input transmitting arm 2 rotates also in the counterclockwise direction about the axis of the input shaft 1. Following up the counterclockwise rotation of the input transmitting arm 2, the actuating lever 4 moves with the leaf spring 7 as a pivot and causes the sliding pin 25 on the actuating lever 4 to move downwardly, thereby causing the flapper 24 of the nozzle flapper assembly 12 to approach the jet orifice 21 of the nozzle 22.

Consequently, the flowrate of the air supplied through the constriction of the pilot valve 11 and being ejected from the jet orifice 21 is restricted. Accordingly, the nozzle back pressure rises, and this pressure variation is magnified by the pilot valve 11 and taken out of the output take-out port O of the pilot valve 11. As a result, the air pressure within the feedback bellows 8 and the output pipe increases, and the feedback bellows 8 expands upwardly against the force of the counter-springs 10.

This upward movement of the upper part of the bellows 8 is transmitted through the pin 43 to cause the auxiliary actuating lever 34 to rotate in the counter-clockwise direction as viewed in FIGURES 3 and 5 with the mounting plate spring 35 as a pivot, thereby to magnify the movement of the feedback bellows 8 and cause the leaf spring 7 to move upwardly. Accordingly, the actuating lever 4 is caused to rotate in the counter-clockwise direction with the point of contact between the actuating lever 4 and the input transmitting arm 2 as a pivot and, through the sliding pin 25, returns the flapper 24 of the nozzle flapper assembly 12 to its original position.

Thus, the position of the flapper 24 of the nozzle flapper assembly 12 is determined; the pressure of the air flowing through the output air lead-out pipe 28 connected to the pilot valve 11 is determined; and this air pressure is taken out as the desired output.

In the embodiment of the invention operating in the above described manner, the ratio $P_o/X$ (that is, the gain) of the pressure $P_o$ (output) of the air flowing through the output air lead-out pipe 28 to the displacement X (input) applied from the input shaft 1 to the actuating lever 4 can be changed in a simple manner as described in detail with respect to the embodiment of the invention shown in FIGURE 1. This is, by turning the movable part 14 of the nozzle flapper assembly 12 about the stationary part 13 as a center of rotation, and changing the position of contact of the sliding pin 25 secured to the flapper 24 on the actuating lever 4 to vary the actuating lever ratio $bc/ab$, the gain can be easily varied without lowering the accuracy.

In this changing of the gain, if the actuating lever 4 is not horizontal, the zero point will shift. In the apparatus according to the invention as described above, however, such a shift in the zero point can be fully corrected by turning the aforementioned adjusting nut 40, thereby to adjust the vertical position of the free end of the plate spring 36, thereby causing, through the mounting plate spring 35, the auxiliary actuating lever 34 to move rotationally with its point of contact with the pin 43 on the upper part of the feedback bellows 8 as a pivot, and thereby adjusting, through the leaf spring 7, the orientation of the actuating lever 4 to the horizontal position.

Furthermore, since the actuating lever mechanism is so constructed that the movement of the feedback bellows 8 is transmitted by way of the auxiliary actuating lever 34 to the actuating lever 4, the quantity of movement of the feedback bellows 8 is magnified and then transmitted to the actuating lever 4. Accordingly, since the range of expansion and contraction of the feedback bellows 8 can thereby be made small, whereby the adverse effect of the area of the feedback bellows varying slightly in accordance with this expansion and contraction of the bellows and becoming a cause of error is substantially suppressed. Accordingly, the effect of the bellows characteristics on the linear error is greatly reduced.

It is an additional feature of the above described embodiment of the invention that, by disposing the point of coupling of the input shaft 1 and the input transmitting arm 2, the centerline of the feedback bellows 8, and the center of rotation of the nozzle flapper assembly 12 in one and the same vertical plane, balance on the two sides of the said plane is attained. Accordingly, the entire apparatus can be made into a miniature, compact form.

Moreover, since the nozzle flapper assembly 12 is not rigidly fixed to the actuating lever 4, the moving parts do not require the mechanical strength which they would require if the nozzle flapper assembly 12 were to be fixed thereto. Accordingly, the weight (mass) of the lever mechanism can be greatly reduced, and, since the natural frequency of the mechanism can thereby be made large, the mechanism is stable with respect to external vibrations.

A further advantageous feature of the above described embodiment of the invention is the facility with which the output produced can be changed in a simple manner between an output in direct proportion to the input and an output inversely proportional to the input. More specifically, this change in the sign of proportionality may be accomplished by loosening the tightening screw 33 of the input transmitting arm mounting device 3 shown in detail in FIGURE 4, removing said mounting device 3 from the input shaft 1, disconnecting the adjusting nut 40 and other parts to disconnect the plate spring 36 to which the auxiliary actuating lever 34 is secured, remounting the lever mechanism so disconnected, by means of parts such as the stud bolt 41 provided on the right-hand side (as viewed in FIGURE 3) of the base 6, in a position symmetrically opposite the former position with respect to the vertical plane passing through the centerline of the input shaft 1 and the centerline of the feedback bellows 8, and again mounting the input transmitting arm 2 on the input shaft 1 by means of the input transmitting arm mounting device 3. As a result, the arrangement of parts as shown in principle in FIGURE 6(A) is established.

In this case, when the input shaft 1 rotates in the counter-clockwise direction in response to input increase, it causes the actuating lever 4, through the input transmitting arm 2, to rotate about the leaf spring 7 as a pivot, thereby causing the flapper 24 of the nozzle flapper assembly 12, through the sliding pin 25, to move upwardly, whereby the distance between the jet orifice 21 and the flapper 24 is increased. Accordingly the back pressure of the nozzle flapper assembly 12 decreases, the output pressure of the pilot valve 11 decreases, and the feedback bellows 8 contracts. Consequently, the pin 43 of the feedback bellows 8 moves downwardly to cause the auxiliary actuating lever 34 to move downwardly with the mounting plate spring 35 as a pivot. This downward movement of the auxiliary actuating lever 34 causes the actuating lever 4 to move in the counter-clockwise direction about the point of contact between the actuating lever 4 and the input transmitting arm 2 as a pivot, thereby causing the flapper 24, through the sliding pin 25, to move downwardly to return to its original state. As a result, an air pressure inversely proportional to the input can be obtained as the output from the air pressure lead-out pipe 28.

Furthermore, by utilizing the tightening screw 33 of the input transmitting arm mounting device 3 to adjust the angle of mounting of the input transmitting arm 2 relative to the input arm 1, it is possible to vary the magnitude of the input at which the output begins to appear.

It is to be observed that variation of gain and other operational procedures in the case of the above described inverse operation can be accomplished similarly as in the case of regular operation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. An apparatus for converting displacement into air pressure comprising: an input shaft; an input transmitting arm mounted on the input shaft; a feedback bellows device with a moving part; an actuating lever interlocked at one end thereof by the input transmitting arm and at the other end thereof by the moving part of the feedback bellows device; an actuating arm interlocking means to couple the actuating lever so that one end thereof is interlocked by contact coupling and the other end thereof becomes a pivotal point and, moreover, to impart to the actuating lever a torque for causing the actuating lever to undergo contact interlocked motion; a nozzle flapper assembly having a stationary part and a nozzle flapper adapted to be freely rotatable about the stationary part and provided with a sliding pin arranged to actuate the nozzle flapper; means to couple the sliding pin to a controllably variable point on the actuating lever; and a pilot valve operating to transmit the back pressure of the nozzle flapper assembly to the feedback bellows device and to an actuating air pressure lead-out pipe.

2. An apparatus for converting displacement into air pressure comprising: an input shaft; an input transmitting arm mounted on the input shaft; an auxiliary actuating lever fixed at one end thereof to a base structure; an actuating lever interlocked at one end thereof by the input transmitting arm and at the other end thereof by the other, free end of the auxiliary actuating lever; an actuating lever interlocking means to couple the actuating lever so that one end thereof is interlocked by contact coupling and the other end thereof becomes a pivotal point and, moreover, to impart to the actuating lever a torque for causing the actuating lever to undergo contact interlocked motion; a feedback bellows device with a moving part coupled to an intermediate point of the auxiliary actuating lever; a nozzle flapper assembly having a stationary part and a nozzle flapper adapted to be freely rotatable about the stationary part and provided with a sliding pin arranged to actuate the nozzle flapper; means to couple the sliding pin to a controllably variable point on the actuating lever; and a pilot valve operating to transmit the back pressure of the nozzle flapper assembly to the feedback bellows device and to an actuating air pressure lead-out pipe.

3. An apparatus for converting displacement into air pressure according to claim 2, having a constructional arrangement whereby the centerline of the input shaft, the centerline of the feedback bellows device, and the rotational axis of the nozzle flapper assembly all lie in the same plane.

4. An apparatus for converting displacement into air pressure comprising: an input shaft; an input transmitting arm mounted on the input shaft; an auxiliary actuating lever supported at one end thereof by a base structure; an actuating lever interlocked at one end thereof by the input transmitting arm and at the other end thereof by the other, free end of the auxiliary actuating lever; an actuating lever interlocking means to couple the actuating lever so that one end thereof is interlocked by contact coupling and the other end thereof becomes a pivotal point and, moreover, to impart to the actuating lever a torque for causing the actuating lever to undergo contact interlocked motion; means to adjust the support position of the end supported on the base structure of the auxiliary actuating lever; a feedback bellows device with a moving part coupled to an intermediate point on the auxiliary actuating lever; a nozzle flapper assembly having a stationary part and a nozzle flapper adapted to be freely rotatable about the stationary part and provided with a sliding pin arranged to actuate the nozzle flapper; means to couple the sliding pin to a controllably variable point on the actuating lever; and a pilot valve operating to transmit the back pressure of the nozzle flapper assembly to the feedback bellows device and to an actuating air pressure lead-out pipe.

5. An apparatus for converting displacement into air pressure according to claim 3, wherein the input shaft and the input transmitting arm are coupled by means of an input transmitting arm mounting device, and there is additionally provided means to make possible remounting of parts such that the input transmitting arm, the actuating lever, and the auxiliary actuating arm can be mounted at respectively symmetrical positions on either side with respect to the plane passing through the centerline of the input shaft, the centerline of the feedback bellows device, and the axis of rotation of the nozzle flapper assembly.

References Cited by the Examiner
UNITED STATES PATENTS

| | | | |
|---|---|---|---|
| 2,842,148 | 7/1958 | Jones | 137—85 |
| 2,984,260 | 5/1961 | Hanssen | 137—85 X |
| 3,211,165 | 10/1965 | Jansson | 137—86 |

WILLIAM F. O'DEA, *Primary Examiner.*

A. COHAN, *Examiner.*